Aug. 12, 1930.   C. E. COLE   1,772,456
ICE CREAM FREEZER
Filed Nov. 5, 1928

Inventor
Clifford E. Cole
By Johnston & Jennings
Attorneys

Patented Aug. 12, 1930

1,772,456

UNITED STATES PATENT OFFICE

CLIFFORD E. COLE, OF BIRMINGHAM, ALABAMA, ASSIGNOR, BY MESNE ASSIGNMENTS, TO NINETEEN HUNDRED CORPORATION, OF BINGHAMTON, NEW YORK, A CORPORATION OF NEW YORK

ICE-CREAM FREEZER

Application filed November 5, 1928. Serial No. 317,447.

My invention relates to ice cream freezers of the type embodying a relatively movable cream container and dash element and has for its object the provision of apparatus of the character designated wherein, during operation of the freezer, relative movement between the cream container and dash is automatically interrupted when the cream has frozen to the proper consistency.

A more specific object of my invention is to provide, in an ice cream freezer embodying a rotary cream container and a normally stationary dash, means whereby the dash is released for rotation with the cream container when the cream has frozen to the proper consistency.

A further object of my invention is to provide means, in an ice cream freezer, for automatically indicating when the ice cream has frozen to the proper consistency.

My invention is particularly applicable to ice cream freezers such as disclosed in U. S. Patent No. 1,682,976, issued September 4, 1928, to Basil W. McGinnis, although it will be apparent that it may be employed with other styles of freezers wherein it is desired to interrupt relative motion between the cream container and the dash when the cream has frozen to the proper consistency.

Briefly, my invention comprises a cream container to which rotary motion is imparted in alternately opposite directions by suitable power means, and a dash element within the cream container and normally held against rotation. The means for holding the dash element against rotation is, in turn, held normally stationary by frictional engagement with another element whereby, when the cream has frozen to the proper consistency, the resistance to relative movement between the dash and cream container is so great as to overcome the frictionally engaging holding means and the dash and cream container then rotate in unison. The holding means for the dash is so arranged as to be readily seen by the operator and thereby serves as an indicator showing when the cream is frozen.

Figure 1:
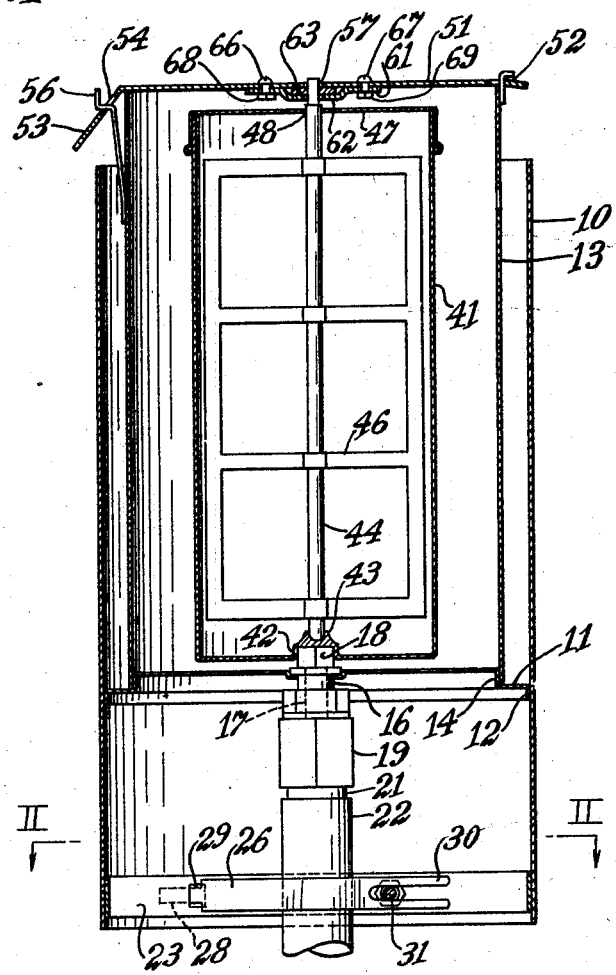
Figure 2:
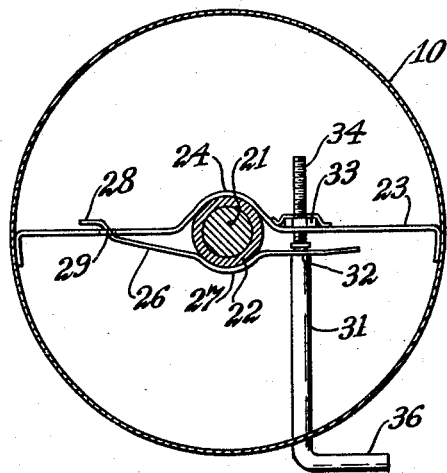
Figure 3:
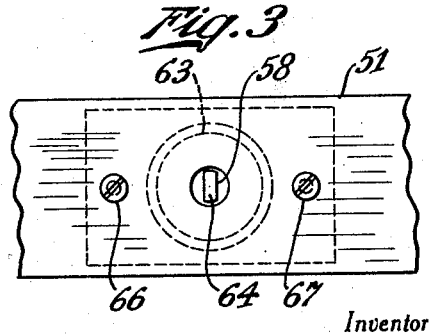

Apparatus embodying features of my invention is illustrated in the accompanying drawings, forming a part of this application, wherein Fig. 1 is a vertical section through an ice cream freezer embodying my invention;
Fig. 2 is a transverse section taken along the line II—II of Fig. 1;
Fig. 3 is a detail plan view of the holding means for the dash elements.

Referring now to the drawings for a better understanding of my invention, I show an ice cream freezer embodying an outer cylindrical casing 10, made of metal, and provided, in the lower portion thereof, with a transverse wall 11 having a flange 12 which is secured in a fluid tight manner to the casing 10 so as to prevent leakage thereby. Within the cylindrical casing 10 is a brine tank 13 which is also secured to the bottom 11, the latter being formed with a ledge 14 to which the lower edge of the tank 13 is secured.

Extending through the wall 11 which, as will be seen, forms the bottom of the brine tank 13, is a sleeve 16 and which is so secured to the bottom in its passage therethrough as to prevent leakage thereby. Fitting within the sleeve and extending therethrough is a shaft 17 carrying at its upper end a squared head 18 and at its lower end a coupling member 19 which fits over a power shaft 21, the latter being, as illustrated, the power shaft of a well known make of washing machine. The details of the shaft 17 and coupling members 18 and 19 are described and claimed in my application, Serial No. 226,107, filed October 14, 1927, and form no part of the present invention.

The power shaft 21 is surrounded by a stationary sleeve 22. Extending transversely of the cylindrical casing 10 and welded thereto near the lower end thereof, is a strap 23 provided with a semi-circular bend 24 midway its ends so as to fit partway round the sleeve 22. A second strap 26, similarly provided with an arcuate bend 27 between its ends, is pivoted to the strap 23 by means of having a curved end 28 thereof inserted through a hole 29 provided in the strap 23. The other end of the strap 26 is forked at 30 to accommodate an adjusting bolt 31 which is provided with a shoulder 32 bearing against the forked end 30 and is provided with a threaded end 34 extending through the strap 23. Fastened to the strap 23 is a nut 33 and the threaded end 34 screws into the nut 33. The outer end of the bolt 31 extends through the outer wall of the casing 10 and is bent to provide a handle 36 whereby the straps 23 and 26 may be tightly clamped about the sleeve 22 to hold the freezer in place when in use and to hold it against rotary movement.

Mounted within the brine tank 13 is a cream container 41 provided on its bottom with a socket 42 in which the coupling member 18 fits and by means of which rotary motion in alternately opposite directions is imparted to the cream container. Inside the container at the bottom thereof is a bearing 43 for a dasher shaft 44 to which latter, dash elements 46 are secured.

The cream container 41 is provided with a flanged lid 47 which fits tightly down thereover and which is provided with a central aperture 48 through which the dasher shaft 44 extends. Extending across the upper end of the brine tank 13 is a strap 51 which is pivotally mounted to the brine tank at 52 and which has a down-turned end 53 provided with a hole 54 which coacts with a latch 56 to hold the strap down.

The strap 51 is provided with a central opening 57 through which the upper end of the dasher shaft 44 extends, the latter being provided with a flattened end 58, as is best seen in Fig. 3. Disposed on the underside of the strap 51 is a short strap 61 bent to provide a recess 62 in which is mounted a washer 63 having an elongated opening 64 therein fitting over the flattened end 58 of the dasher shaft 44. The strap 62 is held in place by a pair of screw head bolts 66 and 67 having nuts 68 and 69 which are welded to the under side of the strap 62, the screw heads of the bolts 66 and 67 projecting above the strap 51.

By the arrangement just described, it will be seen that the washer 63 is held against rotation by its frictional engagement with the straps 51 and 62 and that the degree of frictional engagement may be adjusted by tightening or loosening the bolts 66 and 67.

In operation, the ice cream freezer is mounted in operating position by lowering the casing 10 down over the shaft 21 and sleeve 22, until the coupling member 19 comes over the end of the shaft 21, whereupon the bolt 31 is tightened by means of the handle 36, thus firmly holding the casing 10 and brine tank 13 against rotation with the shaft 21. The cream container 41 is next placed in position with the socket 42 fitting on the head 18 of the shaft 17, the brine container 13 and the cream container 41 being filled, the dash 46 and cover 47 are placed in the cream container and the strap 51 is latched down with the flattened end 58 of the shaft 44 passing through the washer 63.

The shaft 21 is then started to operate by suitable power means, not shown, whereupon the cream container 41 is rotated in alternately opposite directions as the cream freezes. The resistance to relative movement by the dash elements 46 and cream container 41 increases as the cream freezes and when this resistance to relative movement is greater than the resistance to movement of the washer 63 by reason of the tension of the bolts 66 and 67, the washer 63 begins to rotate with the cream container, thereby relieving the dasher elements of strain and indicating when the cream has frozen to the proper consistency. When the operator observes that the flattened end of the shaft 58 is no longer stationary, he knows that the cream is properly frozen.

While I have shown my invention in but one form it will be obvious to those skilled in the art that it is not so limited but is susceptible of various changes and modifications without departing from the spirit thereof, and I desire therefore that only such limitations shall be placed thereupon as are imposed by the prior art, or as are specifically set forth in the appended claims.

What I claim is:

1. In an ice cream freezer, the combination of a cream containing member, an agitating member mounted within said cream containing member, a shaft for oscillating one of said members, and means having coacting surfaces in contact with each other over a large area for causing a frictional force normally holding the other of said members stationary but adapted to permit motion thereof when the cream has been frozen to a predetermined consistency.

2. In an ice cream freezer, the combination of a cream container, a dasher mounted within said cream container, a shaft for turning said cream container about its axis, and means having coacting surfaces in contact with each other over a large area for exerting a frictional force resisting movement of said dasher, said force being less than that tending to turn the dasher with said cream container when the cream has reached a predetermined consistency.

3. In an ice cream freezer, the combination of a cream container, a dasher mounted within said cream container, means for turning said cream container about its axis, means comprising coacting surfaces in contact with each other over a large area for exerting a frictional force normally sufficient to hold said dasher stationary but adapted to permit rotation thereof when the cream reaches a predetermined consistency, said frictional force being constant throughout the range of movement of the dasher, and means for adjusting the position of said surfaces relative to each other whereby the frictional force may be changed for use when different materials are frozen and different consistencies are desired.

4. An ice cream freezer adapted to be mounted in a washing machine having a tub and oscillatory agitator mechanism, said freezer comprising, in combination, a brine tank, a cream container mounted within the brine tank and adapted to be oscillated by the agitator mechanism, a dasher mounted within said cream container, and means comprising coacting surfaces in contact with each other over a large area for exerting a frictional force resisting movement of said dasher in either direction but permitting movement thereof to follow the movement of the cream container when the cream has reached a predetermined consistency.

5. In an ice cream freezer, the combination of a cream container adapted to be turned about its axis, a dasher mounted within said cream container and having a central shaft, and a pair of surfaces held in frictional engagement over a large area normally holding said dasher stationary but slipping to permit movement thereof when the cream has been frozen to a predetermined consistency, the top of said dasher shaft being visible from outside of the freezer whereby its movement may be seen to indicate when the cream is frozen.

6. In an ice cream freezer, the combination of a cream container adapted to be turned about its axis, a dasher mounted within said cream container, and frictional means normally holding said dasher stationary but permitting movement thereof when the cream has reached a predetermined consistency, said means comprising two friction surfaces, one of which is held stationary and the other is rigid against rotation relative to the dasher, and means for clamping said surfaces together.

7. In an ice cream freezer, the combination of a cream container adapted to be turned about its axis, a dasher mounted within said cream container and having a central shaft, and means exerting a frictional force resisting movement of the dasher but adapted to permit movement thereof when the cream has reached a predetermined consistency, said means comprising a disk fixed against rotation relative to the dasher shaft, a member rigid with a stationary part of the freezer, and a clamp for holding said disk in frictional contact with said member.

8. In an ice cream freezer, the combination of a cream container adapted to be oscillated about its axis, a dasher mounted within said container, and frictional surfaces in contact with each other over a large area normally holding said dasher stationary but slipping to permit said dasher to oscillate with said container throughout the full range of movement thereof when the cream has been frozen to a predetermined consistency.

9. An ice cream freezer comprising, in combination, a cream container, a dasher therein, means for rotating one of said parts, and frictional means for holding the other part against rotation, comprising two coacting friction elements, one of which is rigid with said other part and the other of which elements is stationary, and adjustable means for clamping said elements together with varying degrees of pressure.

In testimony whereof I affix my signature.

CLIFFORD E. COLE.